United States Patent
Barber et al.

(10) Patent No.: US 6,587,212 B1
(45) Date of Patent: Jul. 1, 2003

(54) METHOD AND APPARATUS FOR STUDYING VIBRATIONAL MODES OF AN ELECTRO-ACOUSTIC DEVICE

(75) Inventors: Bradley Paul Barber, Chatham, NJ (US); Peter Ledel Gammel, Millburn, NJ (US); John Edwin Graebner, Short Hills, NJ (US)

(73) Assignee: Agere Systems Inc., Allentown, PA (US)

( * ) Notice: Subject to any disclaimer, the term of this patent is extended or adjusted under 35 U.S.C. 154(b) by 210 days.

(21) Appl. No.: 09/702,713

(22) Filed: Oct. 31, 2000

(51) Int. Cl.$^7$ ................................................ G01B 9/02
(52) U.S. Cl. ..................................................... 356/502
(58) Field of Search .............................. 356/502, 498, 356/496, 508, 510, 432 T

(56) References Cited

U.S. PATENT DOCUMENTS

| | | | |
|---|---|---|---|
| 4,502,932 A | 3/1985 | Kline et al. | 204/192 EC |
| 4,556,812 A | 12/1985 | Kline et al. | 310/324 |
| 4,719,383 A | 1/1988 | Wang et al. | 310/324 |
| 4,890,370 A | 1/1990 | Fukuda et al. | 29/25.35 |
| 4,928,527 A * | 5/1990 | Burger et al. | 356/482 |
| 4,988,957 A | 1/1991 | Thompson et al. | 331/107 |
| 5,075,641 A | 12/1991 | Weber et al. | 331/108 C |
| 5,166,646 A | 11/1992 | Avanic et al. | 331/107 |
| 5,185,589 A | 2/1993 | Krishnaswamy et al. | 333/133 |
| 5,231,327 A | 7/1993 | Ketcham | 310/366 |
| 5,232,571 A | 8/1993 | Braymen | 204/192.22 |
| 5,233,259 A | 8/1993 | Krishnaswamy et al. | 310/324 |
| 5,283,458 A | 2/1994 | Stokes et al. | 257/416 |
| 5,291,159 A | 3/1994 | Vale | 333/188 |
| 5,294,898 A | 3/1994 | Dworsky et al. | 333/187 |
| 5,303,457 A | 4/1994 | Falkner, Jr. et al. | 29/25.35 |
| 5,334,960 A | 8/1994 | Penunuri | 333/193 |
| 5,348,617 A | 9/1994 | Braymen | 156/644 |
| 5,367,308 A | 11/1994 | Weber | 343/700 |
| 5,373,268 A | 12/1994 | Dworsky et al. | 333/187 |
| 5,381,385 A | 1/1995 | Greenstein | 367/140 |
| 5,403,701 A | 4/1995 | Lum et al. | 430/315 |
| 5,404,628 A | 4/1995 | Ketcham | 29/25.35 |
| 5,438,554 A | 8/1995 | Seyed-Bolorforosh et al. | 367/140 |
| 5,446,306 A | 8/1995 | Stokes et al. | 257/416 |
| 5,552,655 A | 9/1996 | Stokes et al. | 310/330 |
| 5,587,620 A | 12/1996 | Ruby et al. | 310/346 |
| 5,596,239 A | 1/1997 | Dydyk | 310/311 |
| 5,617,065 A | 4/1997 | Dydyk | 333/186 |

(List continued on next page.)

OTHER PUBLICATIONS

Engan, H., *Phase Sensitive Laser Probe for High–Frequency Surface Acoustic Wave Measurements* vol. SU–25, No. 6, Nov. 1978, p. 372–377.

(List continued on next page.)

*Primary Examiner*—Samuel A. Turner
*Assistant Examiner*—Michael A. Lyons
(74) *Attorney, Agent, or Firm*—Harness, Dickey & Pierce, P.L.C.

(57) ABSTRACT

A method for studying vibrational modes of an electro-acoustic device includes driving the electro-acoustic device to produce at least one vibrational mode therein, collecting phase and amplitude data from the electro-acoustic device using optical interferometry, and mapping the at least one vibrational mode based upon the collected phase and amplitude data. The phase and amplitude data may be processed to provide an instantaneous three-dimensional view of the at least one vibrational mode. Furthermore, a sequence of instantaneous three-dimensional views may be constructed to form a motion picture of the at least one vibrational mode. Additionally, collecting may include raster scanning to provide phase and amplitude data across a surface of the electro-acoustic device.

28 Claims, 5 Drawing Sheets

U.S. PATENT DOCUMENTS

| | | | |
|---|---|---|---|
| 5,630,949 A | 5/1997 | Lakin | 216/61 |
| 5,646,583 A | 7/1997 | Seabury et al. | 333/187 |
| 5,692,279 A | 12/1997 | Mang et al. | 29/25.35 |
| 5,698,928 A | 12/1997 | Mang et al. | 310/322 |
| 5,702,775 A | 12/1997 | Anderson et al. | 428/1 |
| 5,714,917 A | 2/1998 | Ella | 332/144 |
| 5,760,663 A | 6/1998 | Pradal | 333/187 |
| 5,780,713 A | 7/1998 | Ruby | 73/1.82 |
| 5,789,845 A | 8/1998 | Wadaka et al. | 310/334 |
| 5,821,833 A | 10/1998 | Lakin | 333/187 |
| 5,853,601 A | 12/1998 | Krishaswamy et al. | 216/2 |
| 5,864,261 A | 1/1999 | Weber | 333/187 |
| 5,872,493 A | 2/1999 | Ella | 333/191 |
| 5,873,153 A | 2/1999 | Ruby et al. | 29/25.35 |
| 5,873,154 A | 2/1999 | Ylilammi et al. | 29/25.35 |
| 5,883,575 A | 3/1999 | Ruby et al. | 340/572.5 |
| 5,884,378 A | 3/1999 | Dydyk | 29/25.35 |
| 5,894,647 A | 4/1999 | Lakin | 29/25.35 |
| 5,910,756 A | 6/1999 | Ella | 333/133 |
| 5,928,598 A | 7/1999 | Anderson et al. | 264/446 |
| 5,942,958 A | 8/1999 | Lakin | 333/189 |
| 5,963,856 A | 10/1999 | Kim | 455/307 |
| 6,051,907 A | 4/2000 | Ylilammi | 310/312 |
| 6,060,818 A | 5/2000 | Ruby et al. | 310/363 |
| 6,081,171 A | 6/2000 | Ella | 333/189 |
| 6,087,198 A | 7/2000 | Panasik | 438/51 |
| 6,127,768 A | 10/2000 | Stoner et al. | 310/313 A |
| 6,150,703 A | 11/2000 | Cushman et al. | 257/415 |
| 6,198,208 B1 | 3/2001 | Yano et al. | 310/358 |
| 6,204,737 B1 | 3/2001 | Ellä | 333/187 |
| 6,215,375 B1 | 4/2001 | Larson, III et al. | 333/187 |

\* cited by examiner f = 4.658 MHz f = 4.879 MHz f = 5.125 MHz

METHOD AND APPARATUS FOR STUDYING VIBRATIONAL MODES OF AN ELECTRO-ACOUSTIC DEVICE

FIELD OF THE INVENTION

The present invention relates to the field of electro-acoustical devices, and, more particularly, to mapping vibrational modes thereof.

BACKGROUND OF THE INVENTION

It is often desirable to measure the oscillatory surface motion of electro-acoustic devices, such as surface acoustic wave (SAW) devices and thin film resonators (TFR), for example. Such measurements may be useful for evaluating different types of materials, new applications, etc. for these devices. One approach for taking such measurements involves the use of an atomic force microscope (AFM), as described in Safar, H. et al., "Imaging of Acoustic Fields in Bulk Acoustic-Wave Thin-Film Resonators," *Appl. Phys. Lett.* 77, 136–138 (2000), for example.

An AFM includes a scanning tip that is placed adjacent a surface of the sample to measure the magnitude of the surface vibrations. While the AFM provides good lateral and vertical resolution, it is limited by a low frequency response (e.g., less than about 20 kHz). That is, at higher frequencies the scanning tip follows the time-averaged height, which varies depending on whether an RF excitation voltage is turned on or off. Thus, with low-frequency amplitude modulation of the RF drive, the signal at the modulation frequency provides high sensitivity to the magnitude of the motion, but no information regarding its phase.

Various forms of optical interferometry have also been used to observe surface motion of electroacoustic devices. For example, interferometric probing of surface acoustic devices has been reported in articles such as Wagner, J. W., in *Physical Acoustics, Vol. XIX*, Ed. Thurston, R. N. & Pierce, A. D. (Academic, Boston, 1990); Knuuttila, J. V., Tikka, P. T., & Salomaa, M. M., "Scanning Michelson Interferometer for Imaging Surface Acoustic Wave Fields," *Optics Letters* 25, 613–615 (2000); and Drake, A. D. & Leiner, D. C., "Fiber-optic Interferometer for Remote Sub-angstrom Vibration Measurement," *Rev. Sci. Instrum.* 55, 162–165 (1984). However, such prior art interferometric techniques generally lack high frequency response and high spatial resolution.

SUMMARY OF THE INVENTION

In view of the foregoing background, it is therefore an object of the invention to provide a method and apparatus for studying vibrational modes of an electro-acoustic device providing good high frequency response and high spatial resolution to thereby provide three-dimensional imaging of high frequency surface vibrations in electro-acoustical devices.

This and other objects, features, and advantages in accordance with the present invention are provided by a method for studying vibrational modes of an electro-acoustic device including driving the electro-acoustic device to produce at least one vibrational mode therein, collecting phase and amplitude data from the electro-acoustic device using optical interferometry, and mapping the at least one vibrational mode based upon the collected phase and amplitude data. The mapping may include plotting the phase and amplitude data to provide an instantaneous three-dimensional view of the at least one vibrational mode. Moreover, a sequence of the instantaneous three-dimensional views may be constructed to form a motion picture of the at least one vibrational mode. Thus, slow-motion, high-resolution motion pictures representing actual vibrational modes of electro-acoustic devices may be provided according to the present invention.

The electro-acoustic device may be driven with a signal near a resonance frequency of the device. The collecting may include collecting the phase and amplitude data using a Michelson interferometer with an optical detector, for example. An output signal from the optical detector may be homodyned, and the homodyned output signal may be phase-detected to determine the phase and amplitude data. Furthermore, the homodyned output signal may be phase-shifted prior to the phase-detecting to increase signal amplitude.

The collecting may further include directing a sample beam at the electro-acoustic device and comparing a reflected beam with a reference beam. A sensitivity value relating to an alignment error between the reference beam and the reflected beam may be determined, and the amplitude data may be normalized using the sensitivity value. A raster scanner may also be used to step along the electro-acoustic device to provide phase and amplitude data across a surface of the electro-acoustic device.

An apparatus for mapping vibrational modes of an electro-acoustic device according to the invention is also provided. The apparatus may include a signal source for driving the electro-acoustic device to produce at least one vibrational mode therein, an optical interferometer for collecting phase and amplitude data from the electro-acoustic device, and a controller coupled to the signal source and the optical interferometer for controlling the signal source and mapping the at least one vibrational mode based upon the collected phase and amplitude data.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
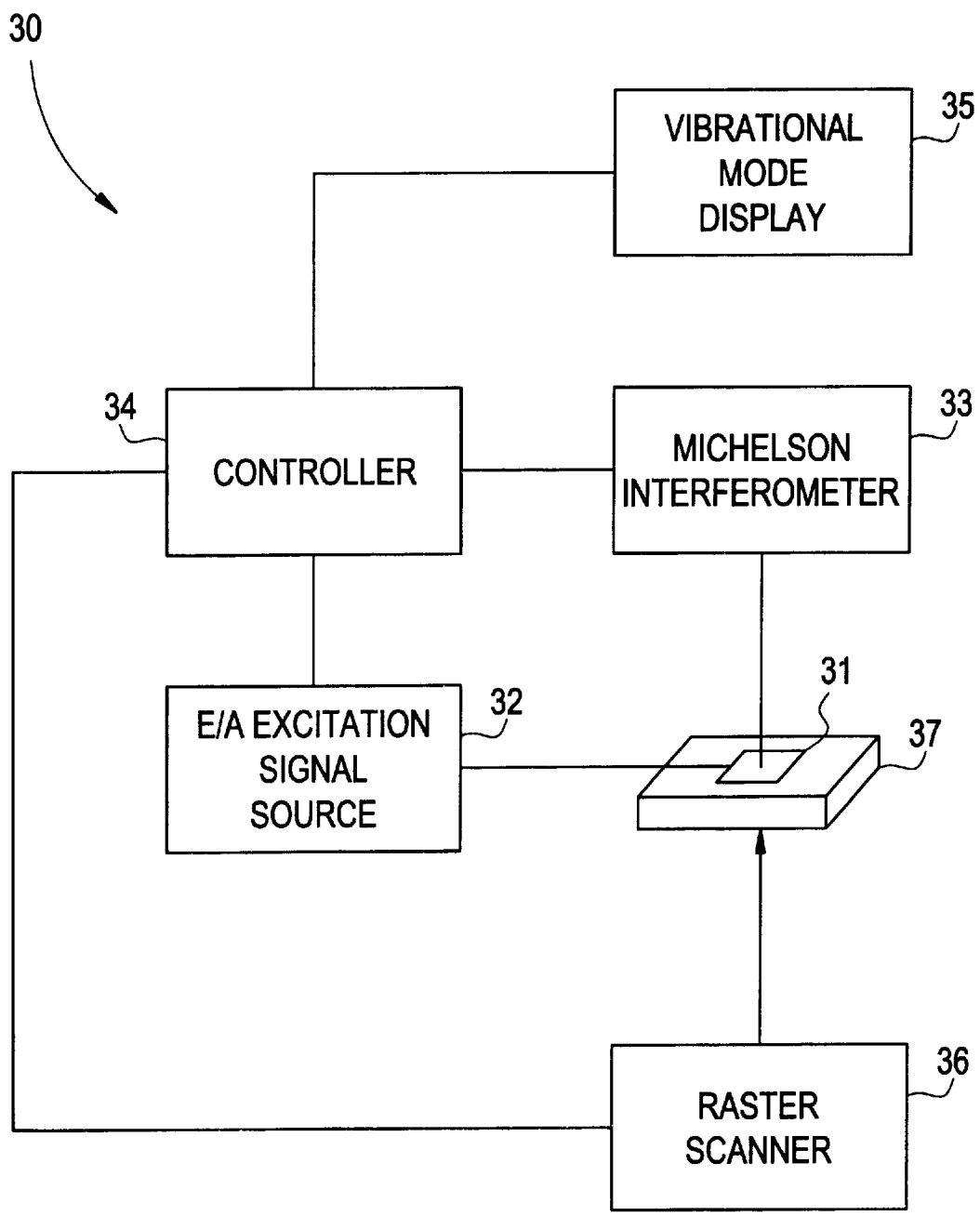
FIG. 1 is a schematic block diagram of an apparatus for mapping vibrational modes of an electro-acoustic device according to the invention.
Figure 2:
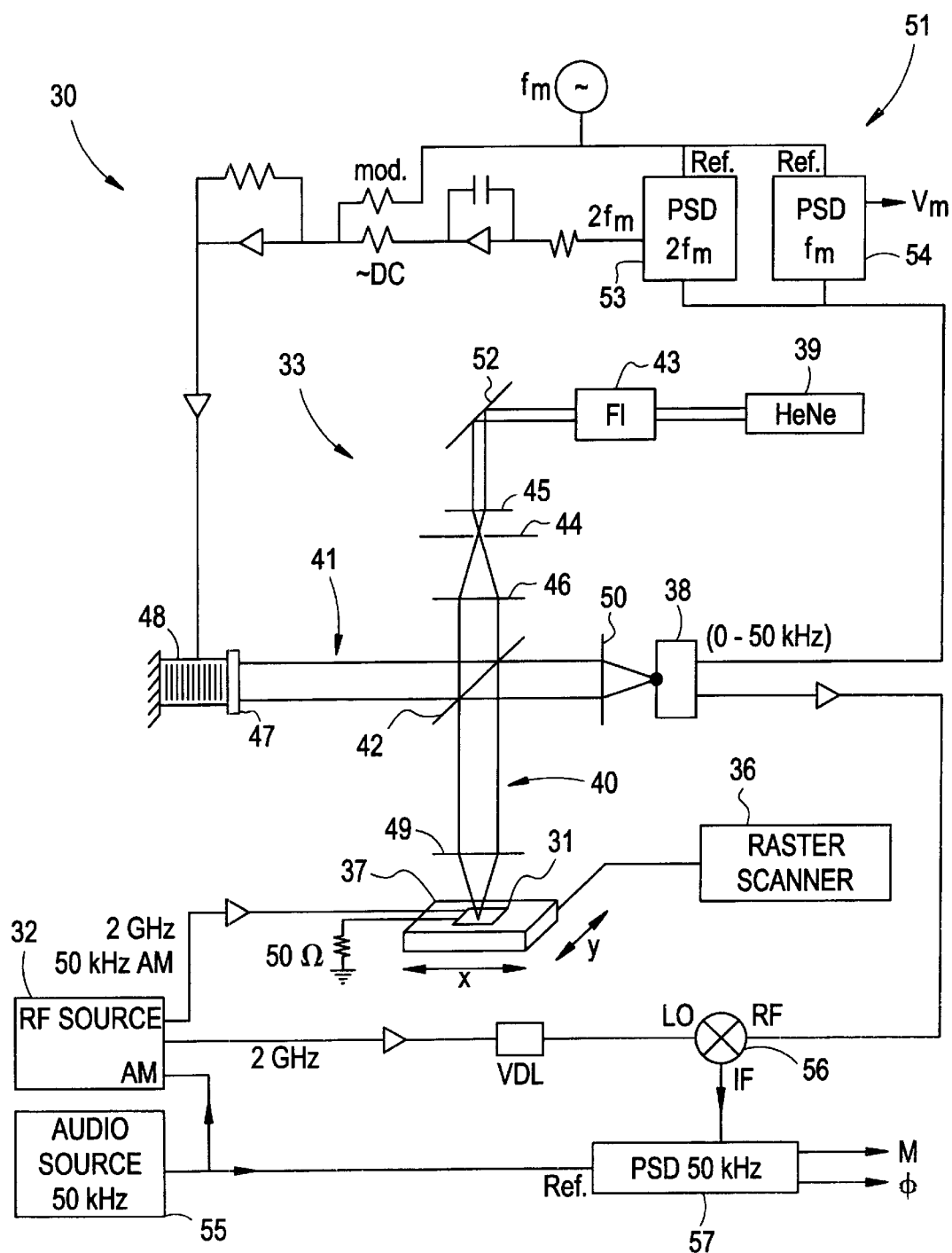
FIG. 2 is a more detailed schematic block diagram of the apparatus of FIG. 1.

Referring now to the schematic block diagrams of FIGS. 1 and 2, an apparatus 30 for mapping vibrational modes of an electro-acoustic device 31 on a substrate 37 according to one aspect of the invention is now described. The apparatus includes a signal source 32 for driving the electro-acoustic device 31 to produce at least one vibrational mode therein. An optical interferometer 33 collects phase and amplitude data from the electro-acoustic device 31. Furthermore, a controller 34 is coupled to the signal source 32 and the optical interferometer 33 for controlling the signal source and mapping the at least one vibrational mode based upon the collected phase and amplitude data, as will be discussed in further detail below.

The optical interferometer 33 may include an optical detector 38 providing an output signal. The controller 34 preferably homodynes the output signal from the optical detector and phase-detects the homodyned output signal to determine the phase and amplitude data. Furthermore, the controller may phaseshift the homodyned output signal prior to phasedetecting to increase signal amplitude.

The optical interferometer 33 includes at least one light source, such as a HeNe laser 39 for directing a sample light beam 40 at the electroacoustic device 31 and for providing a reference light beam 41. The reference light beam 41 may be produced using a beamsplitter 42, as discussed further below, and the optical detector 38 may be used for comparing the reflected light beam 40 and the reference light beam to determine the phase and amplitude data. A sensitivity value relating to an alignment error between the reference light beam 41 and the sample light beam 40 may therefore be determined, and the amplitude data may be normalized using the sensitivity value.

The controller 34 may plot the phase and amplitude data to provide an instantaneous three-dimensional view of the at least one vibrational mode. Moreover, the controller 34 may construct a sequence of instantaneous three-dimensional views to form a motion picture of the at least one vibrational mode. The mapped at least one vibrational mode may be displayed on a display 35 coupled to the controller 34. Furthermore, a raster scanner 36 may be provided for stepping the sample 31 to provide phase and amplitude data across a surface of the sample.

The optical scanning interferometer 33 may be a standard Michelson interferometer with a tightly focused sample beam and a high speed photodetector 38 on the recombined output beams, for example. A feedback system maintains the interference pattern on a single fringe at its maximum sensitivity to sample motion. Variations in the output voltage due to vibrations at a sample frequency may be homodyned and phase-detected at a lower frequency to provide both the amplitude of the motion and its phase relative to the exciting voltage applied to the device. The sample 31 is stepped (using x-y motors) with the raster scanner 36. At each point, amplitude and phase data are recorded and later combined to provide a snapshot in time of the surface.

By stepping the phase mathematically through a complete sample period, successive three-dimensional images are constructed which can be displayed as a motion picture of the vibrations. This slow-motion visualization helps to develop an intuitive understanding of the dynamics and is especially useful in distinguishing between standing waves and traveling waves.

The lateral resolution (dx, dy) is determined by a spot size S of the sample light beam 41 on the sample 31, which may be about 1 μm, for example. The vertical resolution dz may be six to seven orders of magnitude better, i.e., 0.001–0.01 Å. Due to the vibrational noise introduced by the motorized translation stages of the raster scanner 36, the data is preferably collected while the sample 31 is not being moved. After each step, therefore, a pause of one second, for example, allows the system to recover from the motion before data is taken. As such, a typical data collection rate may be about 3000 points/hour, for example. At each step, the magnitude and phase of the signal may be recorded, along with a third variable proportional to the interferometer sensitivity. This third variable is used to normalize the magnitude data, thus taking into account, for example, any variations in reflectivity or degree of focus over the surface of the sample.

The HeNe laser 39 provides a 12 mW, $TEM_{00}$, linearly-polarized, 0.78-mm-dia. beam at an optical wavelength $l_{op}$=632.8 nm with <1% amplitude noise. A Faraday isolator 43 may be used to provide approximately 40 dB discrimination (e.g., about 40 dB) against light reflected back into the laser by a mirror 52, and the combination of a pinhole 44 and lenses 45 and 46 provides beam expansion (e.g., ×6) and spatial filtering. The beamsplitter 42, which may be non-polarized, for example, divides the beam equally into the reference light beam 41 and the sample light beam 40. The reference light beam 41 is reflected from a mirror 47 mounted on a piezoelectric stack (PES) 48 capable of 15 μm of movement for 150 applied volts, which is used for stabilization and calibration. The sample light beam 40 may be focused with a microscope objective 49 (50×, focal length =4 mm, for example) to a small spot on the surface of the sample 31. The reflected sample light beam 40 combines with the reflected reference light beam 41 and is focused by a lens 50 to a diameter waist (e.g., 20 μm) to fit within the active area of the optical detector 38. One example of an optical detector 38 is an InGaAs Schottky photodiode which has about a 25 μm active area diameter. The optical detector 38 is sensitive over a wide bandwidth (e.g., 10 kHz–6 GHz) for the Schottky photodiode and it is also preferably equipped with a bias current monitor 51 providing a separate, low-frequency signal (0–50 kHz).

Figure 3A:
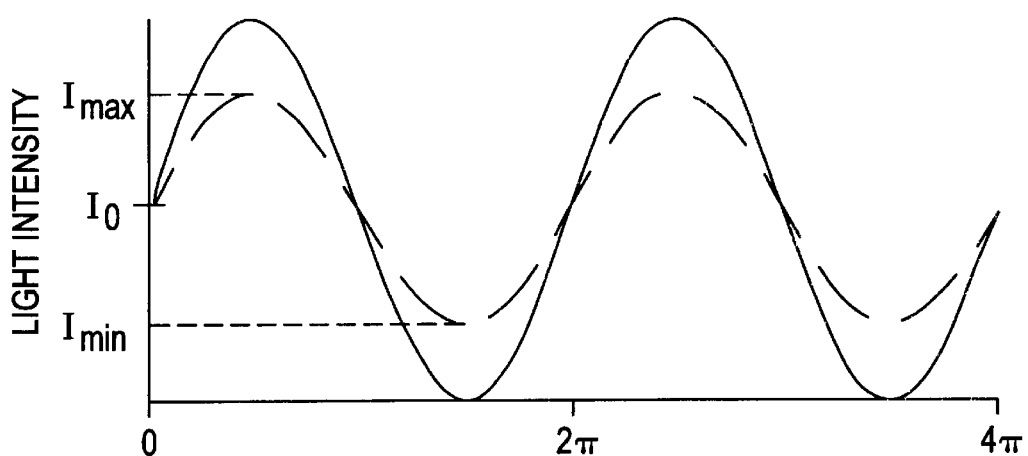
FIG. 3 is a series of graphs illustrating a response function of an interferometer used for measuring phase and magnitude data according to the present invention.
Figure 3B:
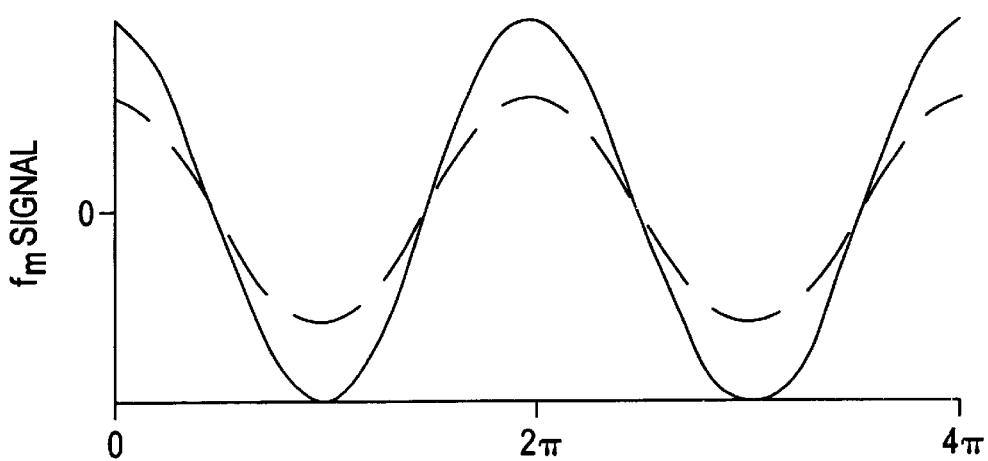
Figure 3C:
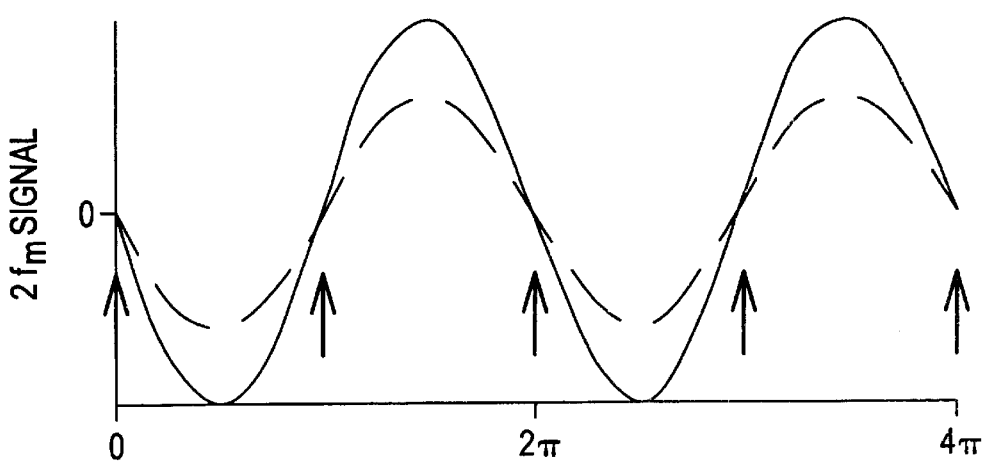

The bias current monitor 51 may be used to monitor a response function of the interferometer 33, which is illustratively shown in FIG. 3. An optical intensity I arriving at the optical detector 38 of the interferometer 33 is sinusoidal in the optical phase difference $\Delta\Phi$ between the sample light beam 40 path ("sample path") and the reference light beam path ("reference path"). Imperfect alignment of the interferometer 33 results in the dashed curves. Modulation of $\Delta\Phi$ at $f_m$=1 kHz and phase sensitive detection (PSD) at $f_m$ yields the $\cos(\Delta\Phi)$ curve, which is used to monitor the interferometer sensitivity. PSD at 2 $f_m$ provides a signal which can be fed back to the PES 48 as an error signal to lock the interferometer 33 onto one of the operating points (illustratively shown with arrows in FIG. 3) corresponding to a maximum sensitivity $dI/d\Phi$.

More specifically, the optical intensity I at the optical detector 33 is a sinusoidal function of the phase difference $\Delta\Phi$ between the two beams 40, 41: $\Delta\Phi=2\pi\Delta p/\lambda_{op}$, where $\Delta p$ is the difference in path length between the two beams. If either the sample 31 or the reference mirror 47 moves a distance $\Delta z$ parallel to the beam, the round trip path length changes by $\Delta p=2\Delta z$ and the phase changes by $\Delta\Phi=4\pi\Delta z/\lambda_{op}$. Therefore, $\Delta\Phi=2\pi$ for $\Delta z=\lambda_{op}/2$. The maximum difference in intensity $I_{max}-I_{min}$ depends on the degree of alignment of the interferometer. For ideal alignment, $I_{max}=2I_o$ and $I_{min}=0$, where $I_o$ is the intensity in each beam. For less than perfect alignment, it is customary in the art to define the visibility $R=(I_{max}-I_{min})/(I_{max}+I_{min})$. The maximum sensitivity $dI/dz=(4\pi/\lambda_{op})dI/d\Phi$, where $dI/d\Phi=(I_{max}-I_{min})/2=RI_o$, yielding $dI/dz=4\pi RI_o/\lambda_{op}$.

Sensitivity of the interferometer 33 to small movements of either the sample 31 or the reference mirror 47 is given by the slope of the interferometer response function. In order to maintain the interferometer at one of the positions of highest slope, the position of the reference mirror 47 on the piezoelectric stack 48 may be modulated at a frequency $f_m=1$ kHz with a peak-to-peak amplitude of $\Delta\Phi\cong\pi/4$, or $\Delta x=\lambda_{op}\Delta\Phi/4\pi=\lambda_{op}/16=40$ nm.

The low-frequency bias-current monitor 51 of the optical detector 33 is used to detect the 1 kHz signal which is then fed to each of two phase sensitive detectors 53, 54, one being tuned to fm and the other to $2f_m$. The $2f_m$ signal is proportional to the second derivative of the interferometer response function and can be used as the error signal in a feedback system, i.e., integrated electronically and fed back to the stack as a low-frequency quasi-DC control signal added to the modulating signal at $f_m$. The interferometer 33 is therefore maintained at a position of highest sensitivity, indicated by the arrows in FIG. 3. The sign of the feedback voltage determines which positions are stable (odd or even multiples of p). The stability thus achieved is independent of the precise amplitude of the interferometer response function, which can vary as the reflectivity of the sample changes, for example. Additionally, the phase sensitive detector 54 tuned to $f_m$ provides a measure of the slope of the interferometer response function, i.e., its sensitivity.

Surface motion can be excited by the application of a high frequency AC voltage, for example, from the signal source 32 to the sample 31. By way of example, the sample 31 may be an interdigital transducer on a piezoelectric material (i.e., SAW devices) or other transducers such as magnetostrictive, electrostrictive, or electromagnetic acoustic transducers, a surface piezoelectric capacitor (i.e., thin film resonators), or other elecrostatically-activated samples (e.g., MEMS-type) known to those of skill in the art. Of course, those of skill in the art will also appreciate that other optically detectable signals from other samples may also be detected in accordance with the present invention. The RF voltage may be amplitude modulated at a frequency lower than the driving frequency (e.g., 50 kHz) by an audio source 55 for later discrimination against noise and applied to the sample 31 at the driving frequency. For example, the driving frequencies may be close to or at a resonant frequency of the sample 31.

The amplified high-frequency output of the optical detector 38 may be homodyned to zero frequency by mixing with the unmodulated RF carrier and phase-shifted to produce maximum signal amplitude, as will be appreciated by those of skill in the art. The resulting sideband at 50kHz may then be phase-detected by a lock-in amplifier, providing both the amplitude (M) and the phase ($\psi$) of the oscillatory signal, as shown in FIG. 2. An RF mixer 56 and a 50 kHz phase sensitive detector 57 operate by taking products of sinusoidal waves such as $A_1\sin(107_1 t+\psi_1)A_2\sin(\omega_2 t+\psi_2)$, resulting in terms like $A_1 A_2\sin((\omega_1\pm\omega_2)t+\psi_1\pm\psi_2)$. Thus the phase of the gigahertz response of the interferometer is carried through to the phase output of the 50 kHz lock-in amplifier. While the absolute value of the phase is not useful, the relative phase from one point to another on the sample represents the true relative RF phase.

Data are collected by the controller 34 by stepping the sample 31 in the raster scanner 36 with respect to the interferometer focal point using x and y motors, which typically have a resolution of about 0.1 $\mu$m. The controller 33 may be a computer or a network analyzer, for example, such as the HP 8712 and 8714 series network analyzers from Hewlett-Packard Co., Palo Alto, Calif. After each step, a pause of 1 second may be imposed to allow the control system and data signals to recover from the vibrationally induced noise of the step, as discussed above. The data collected at each step may include three numbers, namely the magnitude and phase of the 50 kHz signal and the magnitude of the $f_m$ signal from the PSD tuned to $f_m$. The latter is used to monitor the sensitivity of the interferometer and may be used to correct the magnitude of the main signal for changes in the sensitivity due, for example, to changes in the reflectivity of the surface. The $f_m$ signal may also be used to construct a microscope-like image of the electrodes.

As noted above, the lateral resolution on the surface of the sample is dependent upon the spot size S. For a focused Gaussian beam, S is usually defined as the diameter within which most (86%) of the light falls: $4\lambda_{op}F/\pi D$, where $\lambda_{op}$ is the laser wavelength, F is the focal length of the objective, and D is the diameter of the beam incident on the objective. For example, S may be about 0.8 $\mu$m with an f number of F/D=0.8 This spot size is still greater than the positional resolution of the motors noted above. The depth of focus DOF is given approximately by $8\lambda_{op}F^2/\pi D^2=1.6\mu$m, for the above case. Both the surface of the sample 31 and the translation axes may be perpendicular to the beam direction to ensure that the sample (which is assumed to be flat) is in focus over the entire scanned area. The maximum allowable misalignment, in radians, for a typical scan ranging over $\sim 100S=400\lambda_{op}F/\pi D$ will be DOF/100S=0.02F/D, or 1° for a high-power objective. Typical misalignment may be held to less than about 0.1° according to the present invention using the above described components.

The vertical resolution, perpendicular to the surface, will typically be more than six orders of magnitude smaller than the lateral resolution. The sensitivity of the interferometer 33, $\Delta I/\Delta z$, can be maximized by using a laser intensity equal to the maximum allowable intensity for the particular detector used (3 mW for linear operation, for example). The maximum net optical power through the beamsplitter 42 to the optical detector 38 is half the laser power, and the operating point is at half the maximum safe power in the optical detector (e.g., about 6 mW). As discussed above, the sensitivity is also proportional to the visibility R, which is typically at least 0.5 with good alignment. Perfect visibility (=1) further increases the signal by only a factor of 2. A typical value of $\Delta I/\Delta z$ is observed to be 5 mW/($\lambda_{op}/4$)=35 mW/mm, for example.

Electrical noise in the detector is indicated by the noise equivalent power (NEP), or the input at which the output signal/noise =1, which for the optical detector 33 described above is 60 pW/$\sqrt[4]{}$Hz. Assuming a bandwidth of 1 Hz and a typical instrumental sensitivity of 35 mW/mm, the NEP corresponds to a position uncertainty of approximately $2\times 10^{-3}$ pm. Yet, the overall noise level is several orders of magnitude higher than this, indicating that the optical detector 33 is not the limiting source of noise, as will be appreciated by those of skill in the art.

The output signal has been observed to be extremely sensitive to such vibrations, which is characteristic of interferometry. A number of precautions may be taken to minimize the effects of such vibrations. For example, the interferometer 33 may be constructed as rigidly and compactly as possible using standard optical components and mounts. The reference mirror 47 and the sample 31 may be positioned to have substantially equal optical path lengths from the beamsplitter 42, e.g., within about 1 mm. Tubes (e.g., 6 mm ID) may also be positioned around the beams 40, 41 in the regions where the beams are not coincident to minimize the effects of air currents and ambient acoustic noise.

Further precautions may include using two stages of vibration isolation to decouple the interferometer from floor vibrations. For example, the interferometer may be mounted on a 0.6 m×1.2 m breadboard supported with springs (resonant frequency=0.9 Hz) above a commercial optical bench with air suspension legs. Additionally, a padded wooden box or the like over the interferometer may be used to shield against ambient acoustic and optical noise. Also, laboratory air-conditioning fans may be turned off during data collection.

Figure 4:
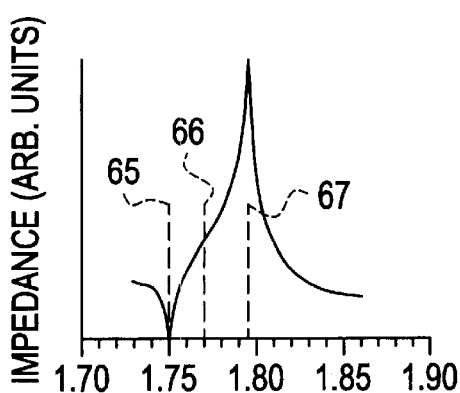
FIG. 4 is a graph of impedance versus driving frequencies for a TFR test sample.
Figure 5:
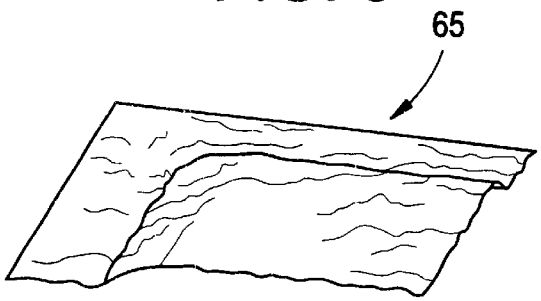
FIGS. 5–7 are three-dimensional mapped views of vibrational modes of the TFR test sample corresponding to the frequencies in the graph of FIG. 4.
Figure 6:
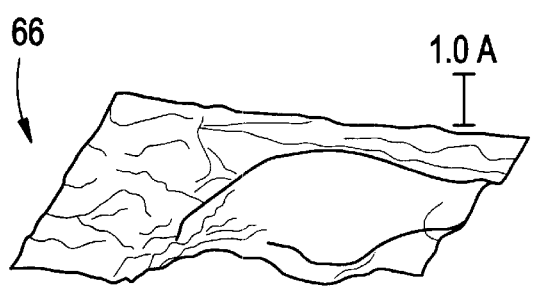
Figure 7:
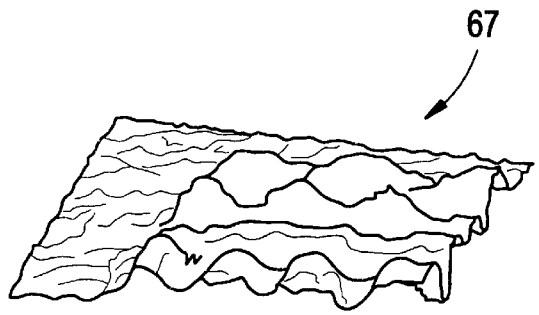
Figure 8:
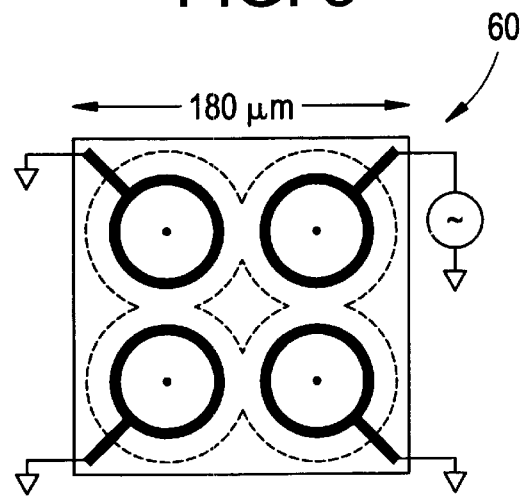
FIG. 8 is a schematic diagram of a micro-electro-mechanical system (MEMS) four-drumhead resonator test sample.

Turning now to FIGS. 4–6, illustrations of various vibrational modes mapped in accordance with the present invention may be seen. Driving frequencies 65–67 used to produce vibrational modes in a TFR are shown with dotted lines in the graph of FIG. 4 which illustrates impedance at the various frequencies. The TFR generates enhanced vertical motion at the drive frequency for which the thickness of the piezoelectric layer (e.g., a 2.75 $\mu$m layer of AlN) is just half an acoustic wavelength. At the driving frequency 65 of 1.75 GHz, i.e., resonance zero, this produces a uniform up and down pancake mode (FIG. 6), while at slightly higher frequencies 66, 67 near the pole, the mode pattern is much more complicated (FIGS. 7 and 8, respectively). For these driving frequencies 66, 67, the phase information is particularly important for obtaining the correct instantaneous surface shape.

The average in-plane wavelength observed for the above TFR varies smoothly with frequency in a way that can be understood by treating the photoelectric layer as an acoustic waveguide, as will be appreciated by those of skill in the art. Motion pictures at the above three frequencies show this behavior clearly and also demonstrate that the waves are standing waves. Other standing-wave patterns, with wavelengths in the 2–5 $\mu$m range, are observable, especially in scans with a smaller step size. Fourier analysis of what appears to be noise away from the electrode reveals discrete propagation vectors with random orientation in the plane. Calculation of the dispersion curves for the allowed modes in this layered structure serve to identify the observed modes as Lamb modes (10–50 $\mu$m wavelength) and surface acoustic waves (2–5 $\mu$m wavelength). Measurement of the mode structure is important for understanding and improving the electro-mechanical response of this piezoelectric system.

Figure 9:
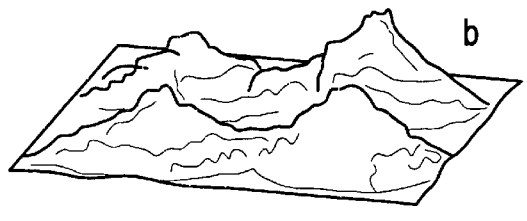
FIGS. 9–11 are three-dimensional mapped views of vibrational modes of the MEMS test sample of FIG. 8 corresponding to various driving frequencies.
Figure 10:
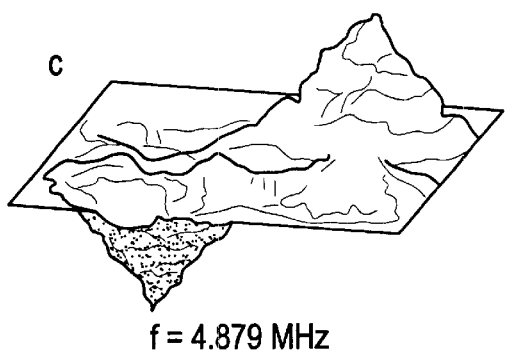
Figure 11:
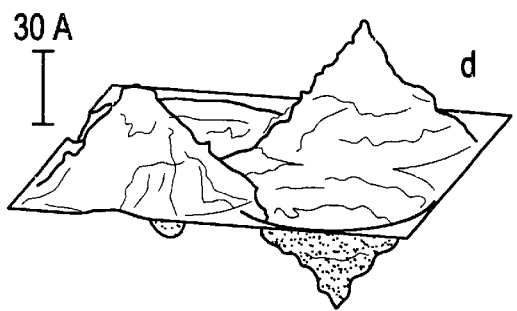

Maps of the data for a micro-electro-mechanical system (MEMS) four-drumhead resonator 60 (illustratively shown in FIG. 8) for three different driving frequencies may be seen in FIGS. 9–11. Each drumhead may be formed by etching away a portion of a sacrificial layer through an access hole in a top layer, for example. The etching is allowed to continue long enough that the circular drumheads overlap slightly and are therefore coupled to each other mechanically. One drumhead is driven electrically, as described above, with a single-polarity RF voltage applied to an Au ring electrode thereof, generating an electrostatic RF attraction to a grounded, doped Si substrate. The coupling between drumheads results in three vibrational modes at the frequencies shown, with obvious phase relationships.

The phase pattern observed at the lowest-frequency resonance where all of the drumheads are in phase (FIG. 9) implies that the mode-determining coupling parameter is the strain, not the bending, of the drumhead material in the overlap region. If bending were dominant, the vibrational mode shown in FIG. 9 should have the highest resonant frequency instead of the lowest. The identification of such mode structures would clearly be impossible using prior art methods which do not provide phase information, as does the present invention.

The data may be taken through the window of a small vacuum chamber with a partial pressure of air such that a quality factor, or Q, at each resonance is approximately 150. This is low enough to cause additional small phase shifts (besides the obvious 0° or 180° C.) between the driven drumhead and the remaining drumheads, which can be observed readily in the motion pictures of the data.

Figure 12:
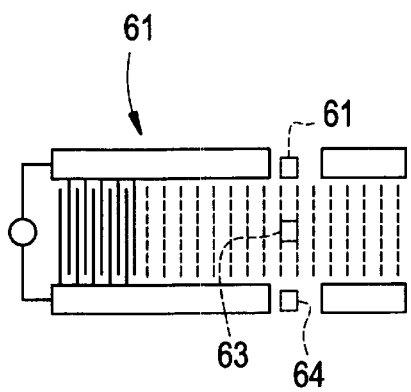
FIG. 12 is a schematic diagram of a piezoelectric crystal test sample having traveling surface acoustic waves thereon.
Figure 13:
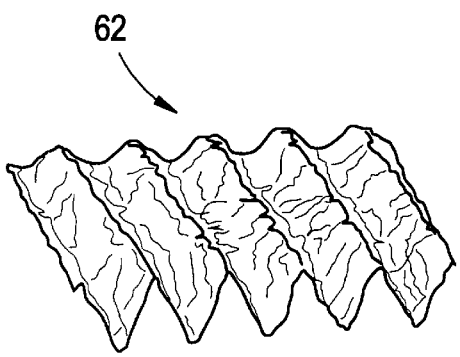
FIGS. 13–15 are three-dimensional mapped views of the traveling surface acoustic waves of the piezoelectric crystal of FIG. 12 taken at various locations on a surface thereof.
Figure 14:
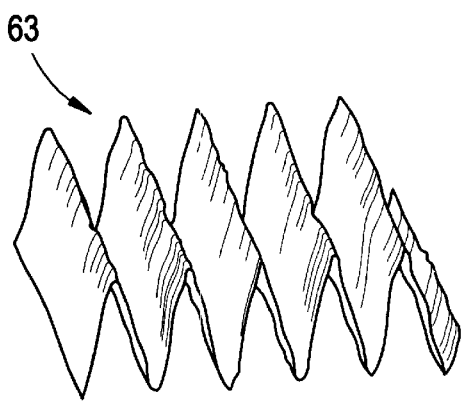
Figure 15:
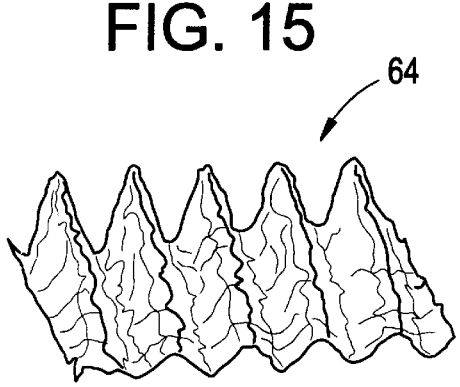

Data for traveling surface acoustic waves on a piezoelectric crystal 61 (shown in FIG. 12) may be seen in FIGS. 13–15. In this example, the waves were generated by applying an RF voltage to an interdigital transducer, as part of a Sawtek filter centered at 170 MHZ with a bandwidth of 1.2 MHZ. The data was taken at three locations 62, 63 and 64 on the bare crystal (corresponding to FIGS. 13, 14, and 15, respectively), approximately 3 mm away from the 1 mm aperture interdigital transducer. One scan at location 63 is in the direct path of the acoustic beam, while the other two locations 62, 64 are to either side of the beam, in regions where waves exist only because of beam spreading by acoustic diffraction. The wavefronts in locations 62, 64 are no longer straight lines across the beam, i.e., the edges lag behind the central beam as expected for diffraction. It is clear from the motion picture that this is a wave traveling to the right, rather than a standing wave. Without phase information as provided by the present invention, a traveling wave would look instead like the pancake mode described with reference to FIG. 5 above.

The general technique described herein may be applied in many areas of science and technology where vibrations of a surface are important. According to the present invention, one gains not only a high-resolution quantitative measurement but also a deeper intuitive understanding of the vibrational modes, as the slow-motion pictures bring the high-frequency motion into the range of human experience. Of course, those of skill in the art will appreciate that the exemplary vertical resolution described above could be increased by 1–2 orders of magnitude (or more) by using a more intense laser and even better isolation from room vibrations. Furthermore, the lateral resolution could be improved by a factor of 10 or more, for example, using near-field optical scanning, as will be appreciated by those of skill in the art. Operation at elevated or reduced sample temperature is possible, and yet higher-frequency optical detectors are also available. None of these extensions would sacrifice the important phase information, which enables accurate and dynamic visualization of these minute vibrational modes.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A method for studying vibrational modes of an electroacoustic device comprising:

driving the electro-acoustic device to produce at least one vibrational mode therein;

collecting phase and amplitude data from the electro-acoustic device using optical interferometry;

processing the phase and amplitude data to provide an instantaneous three-dimensional view of the at least one vibrational mode; and constructing a sequence of instantaneous three-dimensional views to form a motion picture of the at least one vibrational mode.

2. The method of claim 1 wherein collecting comprises collecting the phase and amplitude data using a Michelson interferometer.

3. The method of claim 1 wherein driving comprises driving the electro-acoustic device with a signal near a resonance frequency thereof.

4. The method of claim 1 wherein collecting comprises measuring the phase and amplitude data using an optical detector.

5. The method of claim 4 wherein collecting comprises homodyning an output signal from the optical detector and phase-detecting the homodyned output signal to determine the phase and amplitude data.

6. The method of claim 5 further comprising phase-shifting the homodyned output signal prior to phase-detecting to increase signal amplitude.

7. The method of claim 1 wherein collecting further comprises directing a sample light beam at the electro-acoustic device to generate a reflected light beam and comparing the reflected light beam with a reference light beam.

8. The method of claim 7 further comprising determining a sensitivity value relating to an alignment error between the reference light beam and the sample light beam and normalizing the amplitude data using the sensitivity value.

9. The method of claim 1 wherein collecting comprises raster scanning to provide phase and amplitude data across a surface of the electro-acoustic device.

10. A method for studying vibrational modes of an electro-acoustic device comprising:

driving the electro-acoustic device to produce at least one vibrational mode therein;

collecting phase and amplitude data from the electro-acoustic device using optical interferometry by measuring the phase and amplitude data using an optical detector and homodyning an output signal from the optical detector and phase-detecting the homodyned output signal to determine the phase and amplitude data; and mapping the at least one vibrational mode based upon the collected phase and amplitude data.

11. The method of claim 10 wherein collecting comprises collecting the phase and amplitude data using a Michelson interferometer.

12. The method of claim 10 wherein driving comprises driving the electro-acoustic device with a signal near a resonance frequency thereof.

13. The method of claim 10 further comprising phase-shifting the homodyned output signal prior to phase-detecting to increase signal amplitude.

14. The method of claim 10 wherein collecting further comprises directing a sample light beam at the electro-acoustic device to generate a reflected light beam and comparing the reflected light beam with a reference light beam.

15. The method of claim 14 further comprising determining a sensitivity value relating to an alignment error between the reference light beam and the sample light beam and normalizing the amplitude data using the sensitivity value.

16. The method of claim 10 wherein mapping comprises processing the phase and amplitude data to provide an instantaneous three-dimensional view of the at least one vibrational mode.

17. The method of claim 16 wherein mapping comprises constructing a sequence of instantaneous three-dimensional views to form a motion picture of the at least one vibrational mode.

18. The method of claim 10 wherein collecting comprises raster scanning to provide phase and amplitude data across a surface of the electro-acoustic device.

19. An apparatus for mapping vibrational modes of an electro-acoustic device comprising:

a signal source for driving the electroacoustic device to produce at least one vibrational mode therein;

an optical interferometer for collecting phase and amplitude data from the electro-acoustic device; and a controller coupled to said signal source and said optical interferometer for controlling said signal source and mapping the at least one vibrational mode based upon the collected phase and amplitude data by processing the phase and amplitude data to provide an instantaneous three-dimensional view of the at least one vibrational mode and constructing a sequence of instantaneous three-dimensional views to form a motion picture of the at least one vibrational mode.

20. The apparatus of claim 19 wherein said optical interferometer comprises a Michelson interferometer.

21. The apparatus of claim 19 wherein said signal source drives the electro-acoustic device with a signal near a resonance frequency thereof.

22. The apparatus of claim 19 wherein the optical interferometer comprises an optical detector providing an output signal corresponding to the phase and amplitude data.

23. The apparatus of claim 22 wherein said controller homodynes the output signal from the optical detector and phase-detects the homodyned output signal to determine the phase and amplitude data.

24. The apparatus of claim 22 wherein said controller phase-shifts the homodyned output signal prior to phase-detecting to increase signal amplitude.

25. The apparatus of claim 19 wherein the optical interferometer comprises:

at least one light source for directing a sample light beam at the electro-acoustic device to generate a reflected light beam and for providing a reference light beam; and an optical comparator for comparing the reflected light beam and the reference light beam to determine the phase and amplitude data.

26. The apparatus of claim 25 wherein the controller determines a sensitivity value relating to an alignment error between the reference light beam and the sample light beam and normalizes the amplitude data using the sensitivity value.

27. The apparatus of claim 19 further comprising a raster scanner for stepping the electro-acoustic device to provide phase and amplitude data across a surface of the electro-acoustic device.

28. The apparatus of claim 19 further comprising a display coupled to said controller for displaying the mapped at least one vibrational mode.

* * * * *